US011561957B2

(12) United States Patent
Munshed et al.

(10) Patent No.: US 11,561,957 B2
(45) Date of Patent: Jan. 24, 2023

(54) IN-PLACE GARBAGE COLLECTION FOR STATE MACHINE REPLICATION (71) Applicant: VMware, Inc., Palo Alto, CA (US)

(72) Inventors: Maithem Munshed, Palo Alto, CA (US); Xin Li, Mountain View, CA (US); Wenbin Zhu, Mountain View, CA (US); Anny Martinez Manzanilla, Santa Clara, CA (US); Michael Wei, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 222 days.

(21) Appl. No.: 16/875,640

(22) Filed: May 15, 2020

(65) Prior Publication Data

US 2021/0357385 A1 Nov. 18, 2021

(51) Int. Cl.
G06F 16/00 (2019.01)
G06F 16/23 (2019.01)
G06F 12/02 (2006.01)

(52) U.S. Cl.
CPC ...... *G06F 16/2358* (2019.01); *G06F 12/0253* (2013.01); *G06F 16/235* (2019.01); *G06F 16/2322* (2019.01); *G06F 16/2365* (2019.01)

(58) Field of Classification Search
CPC .................................................. G06F 16/2358
See application file for complete search history.

(56) References Cited

U.S. PATENT DOCUMENTS

| 6,925,476 | B1 * | 8/2005 | Multer | G06F 16/1734 |
| 8,751,598 | B1 * | 6/2014 | Shankar | H04L 69/40 |
| | | | | 707/613 |
| 2007/0033354 | A1 * | 2/2007 | Burrows | G06F 16/184 |
| | | | | 711/156 |
| 2008/0235295 | A1 * | 9/2008 | Parkinson | G06F 11/1474 |
| 2010/0211554 | A1 * | 8/2010 | Reid | G06F 16/2358 |
| | | | | 707/703 |
| 2020/0356442 | A1 * | 11/2020 | Agarwal | G06F 11/1469 |

OTHER PUBLICATIONS

Mechaoui, Moulay Driss, et al. "Log garbage collector-based real time collaborative editor for mobile devices." 6th International Conference on Collaborative Computing: Networking, Applications and Worksharing (CollaborateCom 2010). IEEE, 2010.*
Kim, Jongbin, et al. "Long-lived transactions made less harmful." Proceedings of the 2020 ACM SIGMOD International Conference on Management of Data. 2020.*

* cited by examiner

*Primary Examiner* — Nan Hutton (57) ABSTRACT

Garbage collection processing in a distributed shared log system includes a client identifying obsoleted log entries for a shared data object. The client sends information associated with the identified obsoleted log entries to a shared log server. The shared log server receives information associated with obsoleted log entries from all clients in the distributed shared log system and uses the information to delete the obsoleted log entries. The shared log server can update a snapshot mark to indicate the earliest time that a snapshot of the shared log can be taken. The snapshot mark can be updated based on the information associated with obsoleted log entries.

23 Claims, 8 Drawing Sheets

IN-PLACE GARBAGE COLLECTION FOR STATE MACHINE REPLICATION

BACKGROUND

State machine replication (SMR) is a common paradigm used in distributed systems to provide fault-tolerant and high availability services. Building distributed fault-tolerant data stores is a common application of SMR, among a wide variety of other fault-tolerant services. SMR is typically implemented as a distributed shared log to provide shared access to data objects among a network of clients. The shared object is modeled as a state machine and the log entries are update operations. Strictly ordered shared log entries can be replicated across multiple servers in the order they are accepted into the shared log to achieve redundancy and thus fault-tolerance. The client does not read the latest value (state) of a shared object directly. Instead, the client synchronizes its local state by sequentially playing back the update operations read from the shared log, a process referred to as replay or playback. For the sake of generality to support arbitrary state machines, SMR does not require the servers to know the semantics of the replicated entries; its main concern is to ensure the consistency of the shared log. Garbage collection is an important aspect of an SMR-based distributed system. Without a garbage collection functionality to reclaim obsolete operations in the shared log, an ever-growing shared log would exhaust storage space.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 5A-5I show an example of processing in accordance with the present disclosure.

DETAILED DESCRIPTION

Disclosed is a generic in-place garbage collection mechanism for SMR-based shared logs that exhibit lower write amplification. In production systems, the shared log of SMR should exhibit bounded growth; otherwise, the system will eventually run out of storage. Every time an object is updated, an obsoleted log entry in the shared log (referred to in this field as "garbage") is potentially produced. Without proper garbage collection mechanisms, the ever growing log would eventually exhaust storage space, even though the size of a coalesced state (i.e., a state where all the changes have been combined) could be much smaller. For example, if the shared log represents the updates to a key-value store, the coalesced state should only contain the most up-to-date key-value pairs and exclude old history values.

Checkpointing and trimming can provide log compaction to reclaim storage space. During log compaction, the coalesced state is serialized and written by the client as one or more checkpoint entries (to the shared log and then all log entries before the checkpoint are trimmed to reclaim storage space. Although simple, checkpointing and trimming suffers from two major issues.

Wasting Resources and Impacting System Performance.

Real-world workloads are usually skewed. For example, in a networking system a database may be used to store firewall rules, router/switch configurations, port statistics, etc. Those portions of the data that relate to configuration rarely change, while the statistical data are updated frequently. The checkpointing approach can end up rewriting both the static configuration tables over and over which results in large write amplification, since checkpointing requires rewriting the coalesced states of all shared objects in the system. This write amplification wastes CPU cycles and I/O bandwidth, which significantly impacts the performance of normal workloads.

Imposing Extra Operations Burden.

For a general SMR-based system, the servers are agnostic to the underlying data structures over SMR, so checkpointing has to be initiated from client side, who understands the coalesced SMR state. To checkpoint the entire state, the system needs a dedicated client that understands all the data structures and is capable of serializing and deserializing them.

In accordance with the present disclosure, embodiments identify obsoleted entries (garbage) every time a new log entry is produced, persisted and read by the consumer. Later on, the servers compact the entries, in place, using the identified garbage information. This fine-grained garbage information, can achieve low write amplification and hence attain low compaction overhead to improve system performance.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
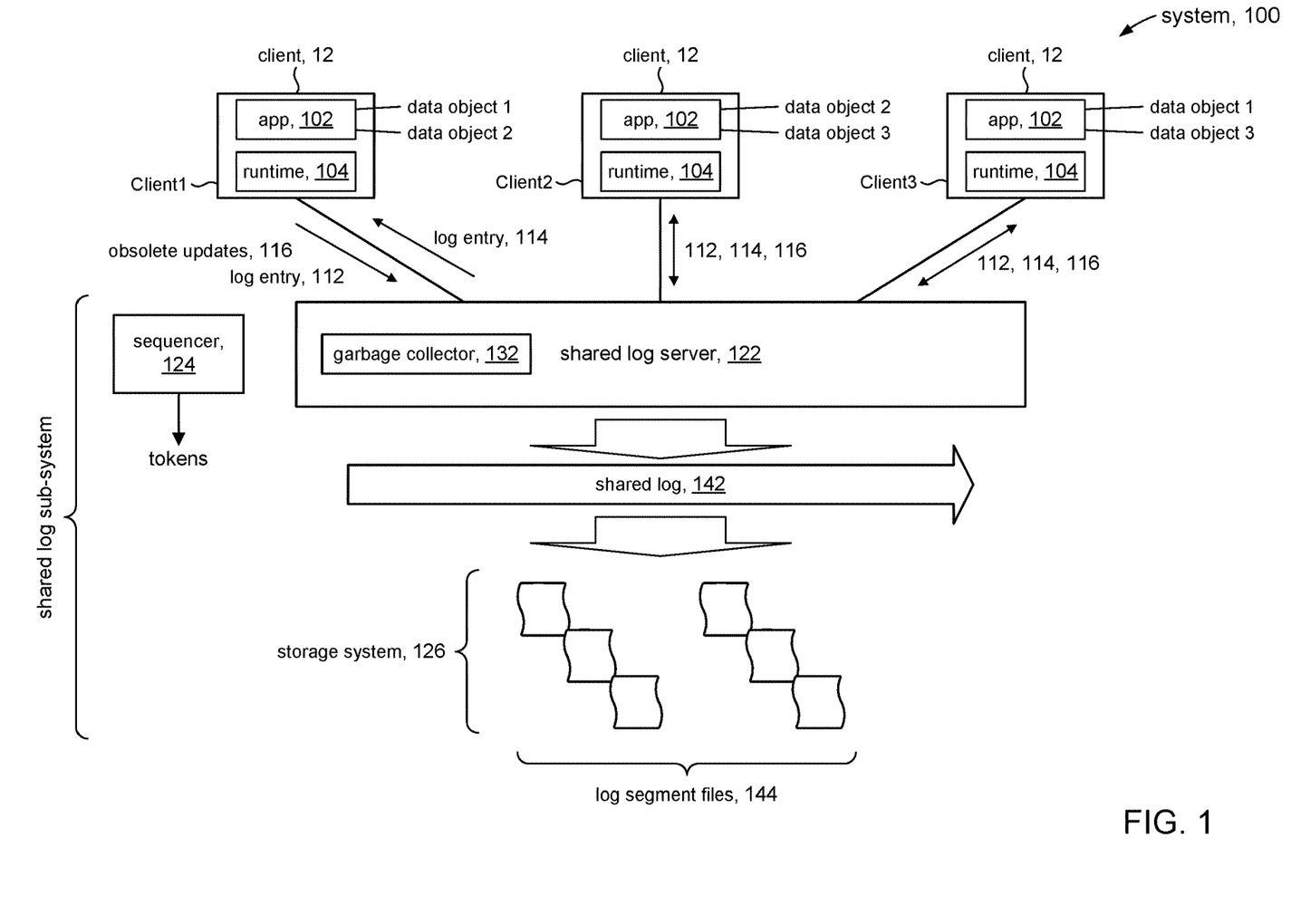
FIG. 1 shows a distributed shared log system in accordance the present disclosure.

FIG. 1 shows a state machine replication (SMR) based distributed system (system 100) for shared data objects in accordance with the present disclosure. In some embodiments, system 100 can include a shared log sub-system to support concurrent access to data objects that are shared among clients 12. FIG. 1, for example, shows that data object 1 is shared by clients 1 and 3, data object 2 is shared by clients 1 and 2, and data object 3 is shared by clients 2 and 3. As used herein, "access" can refer to a client reading updates made to a shared data object, or making updates to a shared data object. Data objects can be any form of data such as simple arrays, lists, queues, key-value maps (e.g., Java HashMap), and so on.

Each client 12 can include two components: client application 102 and client runtime 104. Client application 102 can be viewed as the user of data objects. The client application can be any facility (e.g., a database system) that creates, reads, writes (updates), and deletes data objects. Client runtime 104 can be a suitable interface to the shared log sub-system. In accordance with some embodiments, client runtime 104 can store updates to the data object as log entries 112. Client application 102 can maintain a local copy of a data object (which is typically coalesced) so that it has fast access to the data object. However, changes that client application 102 makes to the data object are stored on the shared log sub-system by client runtime 104.

Client runtime 104 can communicate messages with the shared log sub-system. For example, the client runtime can send log entries 112 to the shared log sub-system when updates are made on data objects. The client runtime can read log entries 114 associated with a data object from the shared log sub-system for updates that were made by the other the clients in system 100. In accordance with the present disclosure, client runtime 104 can provide information 116 that is associated with obsolete updates that were previously made to a data object. These aspects of the present disclosure are discussed in more detail below.

In some embodiments, the shared log sub-system can include shared log 142. The shared log sub-system can further include shared log server 122, sequencer 124, and storage system 126 to support and maintain shared log 142. Shared log server 122 can provide functionality to provide read and write access to shared log 142 on behalf of clients 12.

Sequencer 124 can provide tokens to clients 12 when writing log entries to shared log. 142. A token identifies the next position in the shared log to write or store a log entry. Clients 12 communicate with sequencer 124 to request a token. Sequencer 124 can issue a single token for each token request so that each position in the shared log is written to by only one client. In some embodiments, for example, tokens can be sequence numbers that increase monotonically. Sequencer 124 can increment the token value each time it issues a token in response to a token request so that each token request gets a unique token.

Log entries 112 in shared log 142 can be persisted in storage system 126 as a set of log segment files 144. This aspect of the present disclosure is discussed in more detail below.

Shared log server 122 can include garbage collector module 132. In accordance with the present disclosure, clients 12 can identify obsolete log entries associated with previous updates made to data objects. Clients 12 can send the positions of these obsoleted log entries in the shared log as obsoleted log entries 116 to shared log server 122.

Garbage collector 132 can utilize the position information contained in the received obsoleted log entries to perform data compaction in shared log 142 in accordance with the present disclosure.

Figure 2:
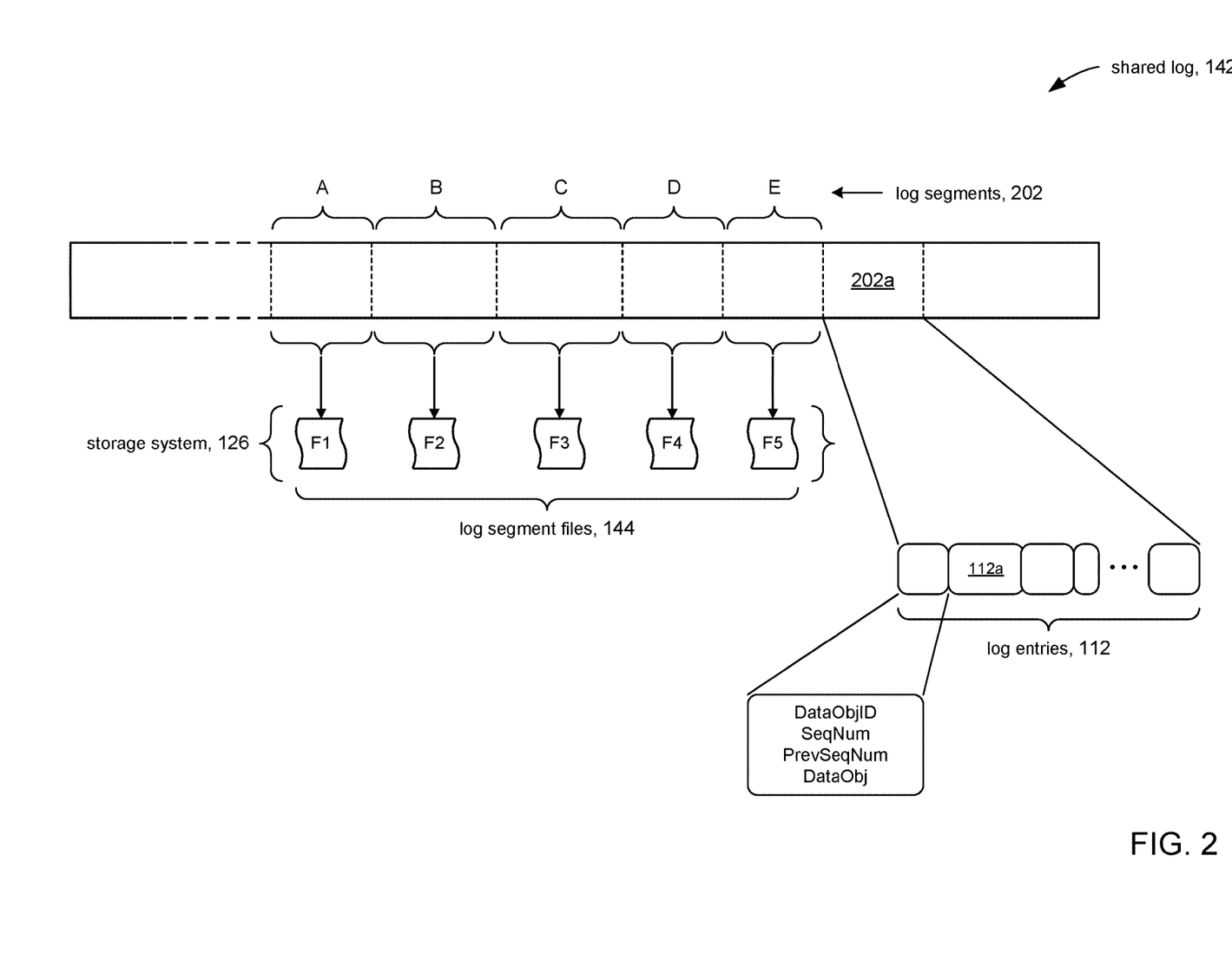
FIG. 2 shows details of a shared log.

Referring to FIG. 2, each client 12 writes log entries 112 to shared log 142 independently of the other clients. Log entries 112 received from clients 12 are written or stored in shared log 142 according the tokens given to the clients. Each log entry 112 encapsulates the update that is made to the shared data object. In some embodiments, the encapsulated information is meaningful to the client that wrote the log entry but is otherwise treated by the shared log server as arbitrary binary data, sometimes referred to as a binary large object (blob). Because clients 12 operate independently of each other, the log entries in shared log 142 can correspond to updates on different shared objects from different clients.

Log entries 112 in shared log 142 can be persisted in storage system 126 as a set of log segment files 144. In some embodiments, log entries 112 can be organized into log segments 202. Each log segment 202a can contain some number of log entries 112. In some embodiments, for instance, each log segment 202a can be defined as holding a predetermined number of log entries 112. Each log segment 202 in the shared log can be mapped to a log segment file 144 in a file system on storage system 126. FIG. 2, for example, shows that the data comprising log entries in log segment A of the shared log are stored in log segment file F1, the data comprising log entries in log segment B are stored in log segment file F2, log segment C is mapped to log segment file F3, and so on.

Figure 3:
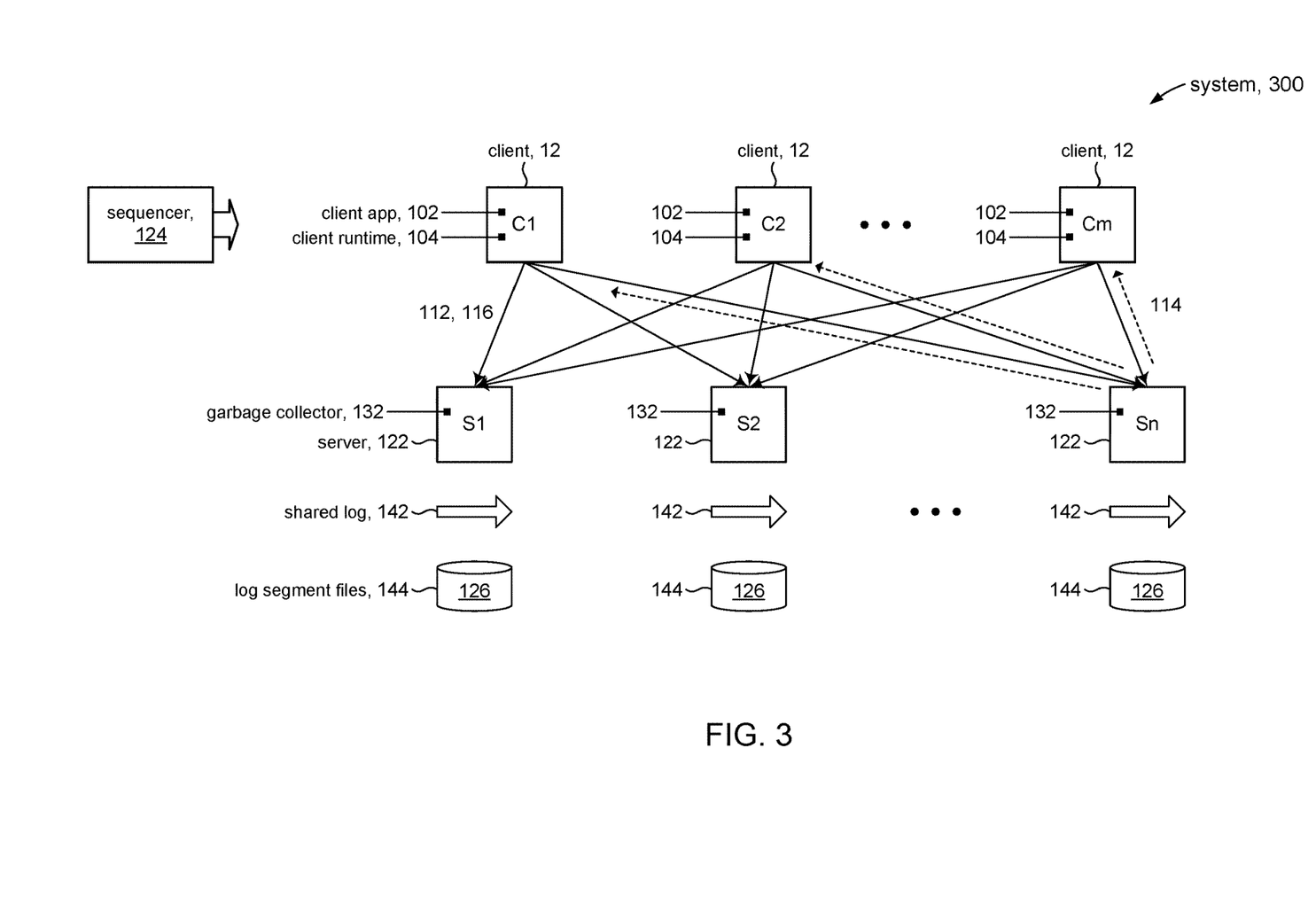
FIG. 3 shows a distributed shared log system configured with a system of shared log servers.

FIG. 3, shows a configuration of a system for shared data objects in accordance with the present disclosure. In accordance with some embodiments, system 300 includes several instances of shared log servers 122, along with corresponding shared logs 142 and storage systems 126 to store log segment files 144. The configuration shown in FIG. 3 represents an example of chain replication. Chain replication is a replication protocol that can achieve strong consistency in large-scale storage services. Each client 12 writes their log entries 112 and their obsolete update message 116 to each shared log server in sequence. For example, a client first writes a log entry to shared log server S1. When shared log server S1 acknowledges the client, the same log entry is then written to shared log server S2, then to shared log server S3, and so on to shared log server Sn. The sequence of servers is referred to as the replication chain. With chain replication, each shared log 142 in the replication chain contains the same sequence of updates. In accordance with the chain replication protocol, log entries are read from the shared log managed by the last server in the replication chain.

In some embodiments, system 300 can be scaled by striping the shared log. For example, odd-numbered servers (e.g., S1, S3, S5, etc.) can define a first replication chain and even-numbered servers (e.g., S2, S4, S6, etc.) can define a second replication chain. Clients 12 can write odd-numbered log entries to shared logs in the first replication chain while even-numbered log entries can be written to shared logs in the second replication chain.

The remaining discussion will be presented with respect to a system configuration have a single shared log server, such as depicted in FIG. 1. It will be understood that the discussion is application in a configuration having multiple shared log servers, such as shown in FIG. 3.

Figure 4:
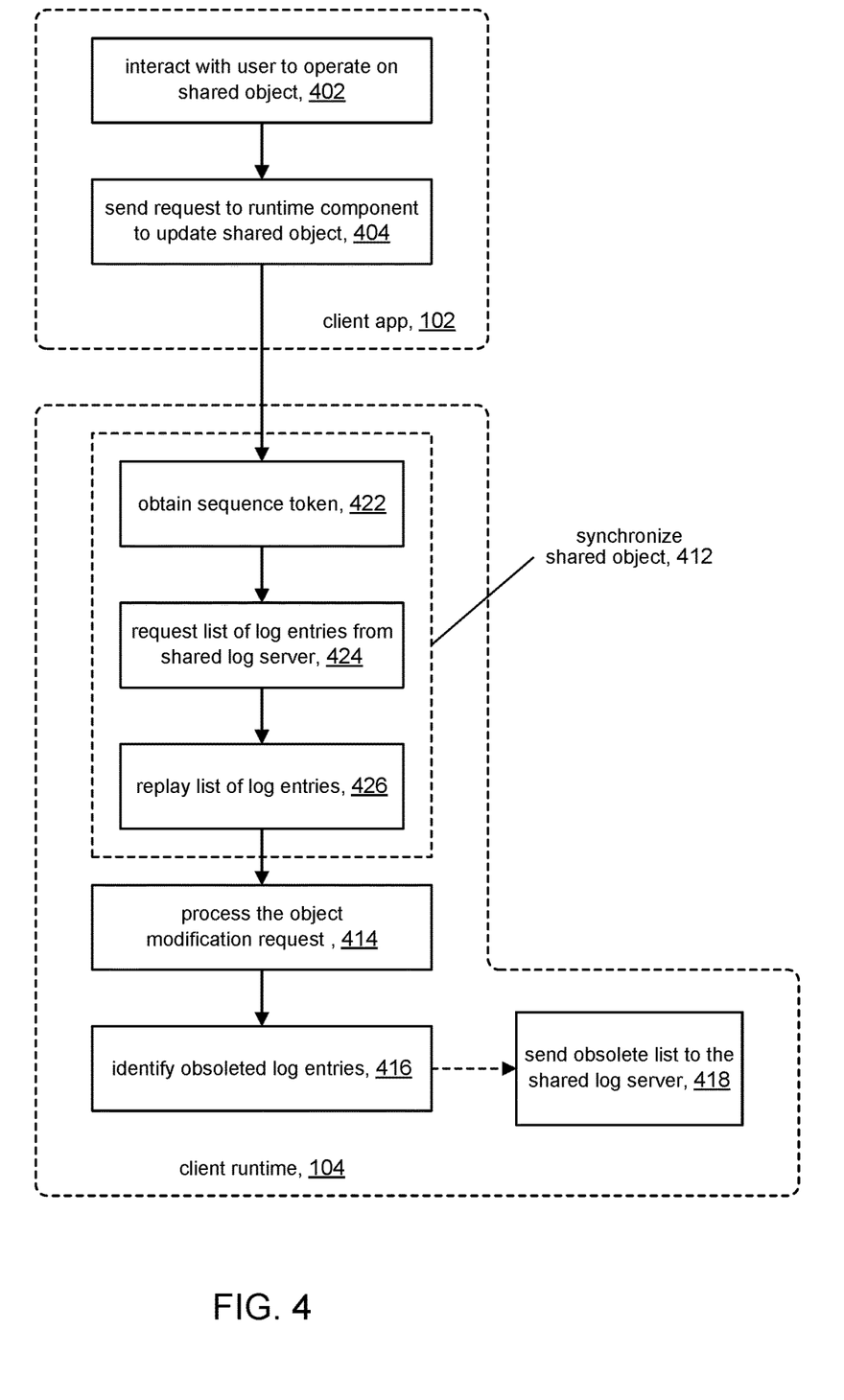
FIG. 4 shows processing in a client in accordance with the present disclosure.

Referring to FIG. 4, the discussion will now turn to a high level description of processing in a client computer (e.g., client 12, FIG. 1) to process data objects in accordance with the present disclosure. Recall from FIG. 1 that the client computer can have two components: client application 102 and client runtime 104. The processing shown in FIG. 4 is divided into processing performed in the application component and processing in the runtime component. In some embodiments, the client computer can include computer executable program code, which when executed by a processor (e.g., 802, FIG. 8), can cause the processor to perform processing in accordance with FIG. 4.

Client Application Processing

The discussion will first describe processing a shared data object by the client application component of a client computer.

At operation 402, the application executing on the client computer can interact with a user (e.g., human user, another application executing on the client computer, another computer, etc.) to operate on the shared data object. At some point, the application will commit the changes made to the shared data object.

At operation 404, the application executing on the client computer can send an object modification request to the client runtime component to initiate the process of committing the changes to the shared data object.

Client Runtime Processing

The discussion will now turn to a description of processing by the client runtime component of the client computer. The client runtime can be invoked by the client application to commit the requested modification on the shared data object. In accordance with the present disclosure, processing in the runtime can include: synchronizing the shared data object, identifying obsolete updates, processing the request, and sending the obsoleted updates to the shared log.

At operation 412, the runtime executing on the client computer can synchronize the shared data object. In accordance with some embodiments, synchronizing the shared data object includes bringing the local state of the data object to the current global state. A shared data object can be associated with a local data state and a global data state. The global state of a shared data object refers to the data state of the shared data object after all updates made by all clients (e.g., clients 12, FIG. 1) in the system have been applied to the data object. The global state of a shared data object can be instantiated by "replaying" all the updates stored in the shared log that were made to the data object. The global state can be deemed as being "embodied" in the shared log, and is instantiated when a client replays its updates. The local state of a shared data object refers the state of the data object with respect to a given client. The data state of the shared data object is "local" in that the state of the data object reflects only the update made by the given client and does not reflect updates made by other clients in the system. As such, each client may have its own local data state for a given data object. The synchronization process can include the following:

At operation 422, the runtime executing on the client computer can obtain a token that represents the next entry in the shared log to store an update. In some embodiments, for example, the client runtime can communicate with sequencer 124 (FIG. 1) to obtain a token.

At operation 424, the runtime executing on the client computer can request a list of log entries from the shared log server. In some embodiments, for example, the request can specify a first location identifier and second location identifier. The list of log entries can include all the log entries stored in the shared log that were written by any client in the system between the first location identifier and the second location identifier. The list of log entries represents all committed updates to the data object made by all clients in the system. The first location identifier can correspond to an earliest-in-time update of the shared data object, while the second location identifier corresponds to the latest-in-time update of the shared data object. For example, the first location identifier can point to the log entry in the shared log that corresponds to a prior update to the shared data object made by the client. The second location identifier can point to the log entry of the latest update to the shared data object made by any client in the system; this information can be maintained by the sequencer for example.

At operation 426, the runtime executing on the client computer can apply (replay) all the update operations in the list of log entries obtained at operation 424 to the client's local copy of the shared data object. As explained, the list of log entries will include any updates made by any client in the system between the first and second location identifiers. Accordingly, when the list is replayed, this will synchronize the local state of the shared data object with the current global state of the data object.

At operation 414, the runtime executing on the client computer can process the object modification request. Since the local copy of the shared data object is current (synchronized) with the global state, by operation of processing at 426, changes can now be made to the data object in accordance with the object modification request. In some embodiments, the runtime can store the object modification request in the shared log. For example, the runtime can encapsulate the object modification request in a log entry (e.g., 112, FIG. 1) and send that log entry to the shared log server along with the token obtained at operation 422. When the runtime has confirmed that the shared log server has committed the log entry (e.g., the runtime can receive an acknowledgement from the shared log server), the runtime can update the local copy of the shared data object in accordance with the object modification request.

At operation 416, the runtime executing on the client computer can identify obsoleted log entries among the list of log entries obtained at operation 424. More specifically, in accordance with the present disclosure the runtime can identify operations previously performed on the shared data object in the list of log entries that are deemed to be obsolete. Such operations can be referred to as garbage operations in the context of the garbage collection process performed by the shared log server. Generally, obsoleted (garbage) operations are update operations that do not contribute to any additional information to the most current global state or version of the shared data object. For example, if the shared log in discussion is a single key-value store and the latest update operation is modifying the value of a specific key, all previous operations on the same key can be deemed obsolete. These aspects of the present disclosure are discussed in more detail below.

In some embodiments, the runtime can maintain a list of obsoleted operations. In some embodiments, for example, each log entry in the list of log entries can include location information that indicates the position of the log entry in the shared log. When the runtime has determined that the operation in a given log entry is obsolete, the runtime can record the given log entry's location information in a list of obsoleted objects (obsolete list). In some embodiments, the runtime can also include recording the size of the log entry in the list of obsoleted log entries.

At operation 418, the runtime executing on the client computer can send the obsolete list to the shared log server. Generally, the obsolete list can be sent to the shared log server independently of sending (operation 414) the new log entry containing the requested object modification. In some embodiments, for example, the runtime can send the obsolete list on a periodic basis, for example, on the order of every tens of minutes or so. In some embodiments, the runtime can send the obsolete list when the total size of the log entries identified in the list reaches or exceeds a predetermined size. In other embodiments, the runtime can send the obsolete list when the number of log entries identified in the list reaches or exceeds a predetermined number. In still other embodiments, the shared log server can signal each client to send their respective obsolete lists, and so on.

Figure 5A:
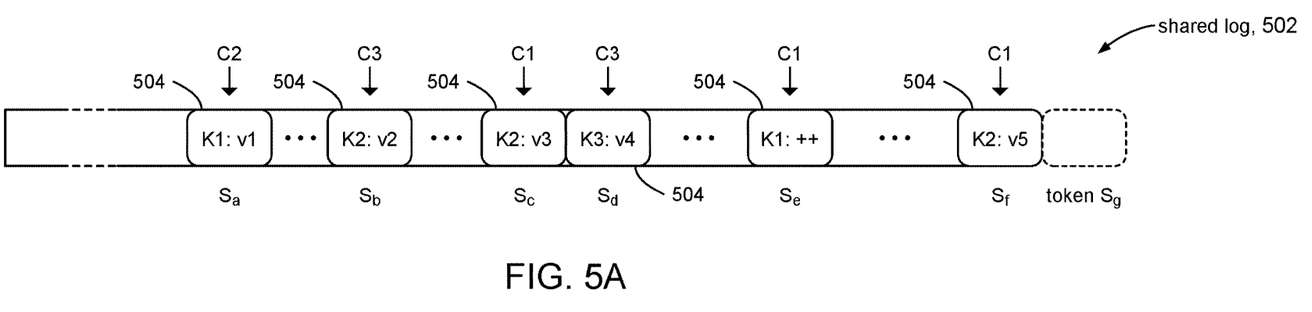
FIG. 5A shows an example of a shared log to demonstrate processing in the client.

Referring to FIGS. 5A-5I, processing in a client in accordance with the present disclosure will be explained with an illustrative example. FIG. 5A shows a shared log 502 in a shared log server. The figure illustrates log entries 504 for a given shared data object, showing the updates made by various clients C1-C3. Positions of log entries 504 in shared log 502 are indicated by locators $S_a$-$S_f$. For discussion purposes, locators $S_a$-$S_f$ can be referred to as relative time indicators; for example, the log entry at location $S_c$ in shared log 502 can be expressed as the log entry at time $S_c$. The log entries can be referenced by their corresponding locators; for example, the log entry at location $S_d$ can be referred to more simply as log entry $S_d$.

For discussion purposes, the shared data object will be a key-value data structure comprising keys K1, K2, and K3 and corresponding values associated with each key. For example, at time $S_a$ key K1 was updated to the value v1, at time $S_b$ key K2 was set to value v2 and later at time $S_c$ key K2 was set to value v3, and so on.

Suppose client C2 wants to update the shared data object. For example, suppose client C2 wants to perform the following operation to the data object:

set key K3 to have value v6.

Per operation 422 in FIG. 4, client C2 can obtain a token (e.g., from sequencer 124) that points to the next position in the shared log to receive a new log entry. In our example in FIG. 5A, the token is $S_g$ (=$S_f$+1).

Figure 5B:
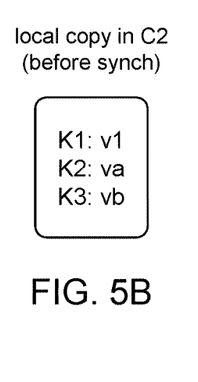
FIG. 5B shows an example of a shared data object before being synched to a global data state.

As indicated in FIG. 5A, client C2 last modified the shared data object at time $S_a$. The local state of the local copy of the shared data object in client C2 will reflect only the change that client C2 made to the data object at time $S_a$, namely setting key K1 to value v1. FIG. 5B illustrates an example of the local copy of the shared data object in client C2. We see that key K2 and key K3 are out of synch with respect to the global state of the data object. For example, the local copy has key K2 at value va and key K3 at value vb, while the global state of the data object (as embodied in the shared log) has key K2 at value v5 and key K3 at value v4.

Figure 5C:
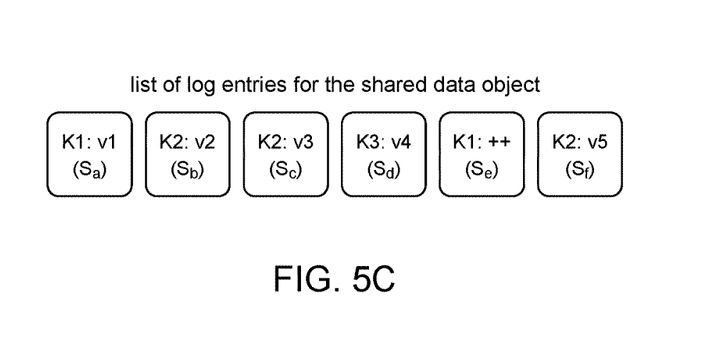
FIG. 5C shows an example of a list of log entries for the shared object.
Figure 5D:
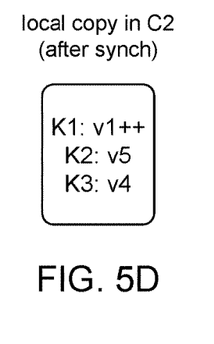
FIG. 5D shows an example of the shared data object after being synched to a global data state.

Per operation 424, client C2 can retrieve a list of log entries between $S_a$ and $S_f$ from the shared log server. FIG. 5C shows an example of the list of log entries retrieved by client C2. When client C2 replays all the update operations in the list of retrieved log entries (per operation 426), C2's local copy of the shared data object will be synchronized to the global state of the data object; this is illustrated in FIG. 5D. Note that at time $S_e$, the update is an increment operation denoted as "++". This operation increments the current value associated with key K1, namely v1, which is represent in FIG. 5D by the notation "v1++". This aspect of our example is discussed in connection with FIG. 5G.

Figure 5E:
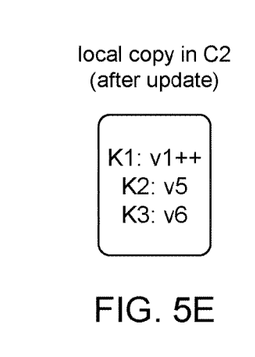
FIG. 5E shows the shared data object after being updated.
Figure 5F:
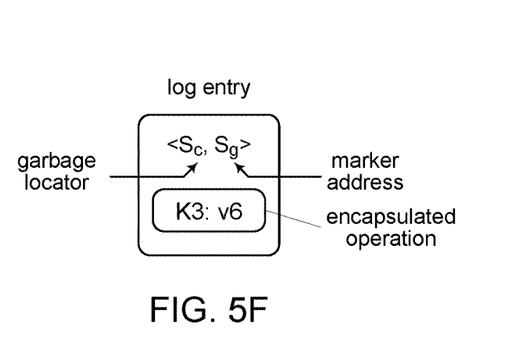
FIG. 5F shows an example of the log entry to be sent to the shared log server.

Client C2 can update its now-synchronized local copy of the shared data object in accordance with the above operation, namely set key K3 to value v6; see FIG. 5E. Referring to FIG. 5F, client C2 can encapsulate the operation in a log entry. The log entry can include the position (marker address) in the shared log to store the log entry; in our example, the marker address is $S_g$. Client C2 can write the log entry to the shared log, thus adding a new log entry to the shared log; this is depicted in FIG. 5F.

In some embodiments, the log entry can include a garbage locator to identify a log entry, if there is one, that is obsoleted by the operation. Client C2 can scan the list of retrieved log entries to identify if any log entry obsoleted by the operation. In our example, for instance, the operation is setting key K3 to value v6. We can seem that this operation makes obsolete the operation in log entry $S_d$ where key K3 was set to value v4. Accordingly, client C2 can set the garbage locator in the log entry to $S_d$. If the operation does not obsolete an earlier log entry, then the garbage locator can be set to some null value that indicates there is no garbage locator for the operation. Garbage locators are used to support snapshot transactions. This aspect of the present disclosure is discussed in more detail below.

Figure 5G:
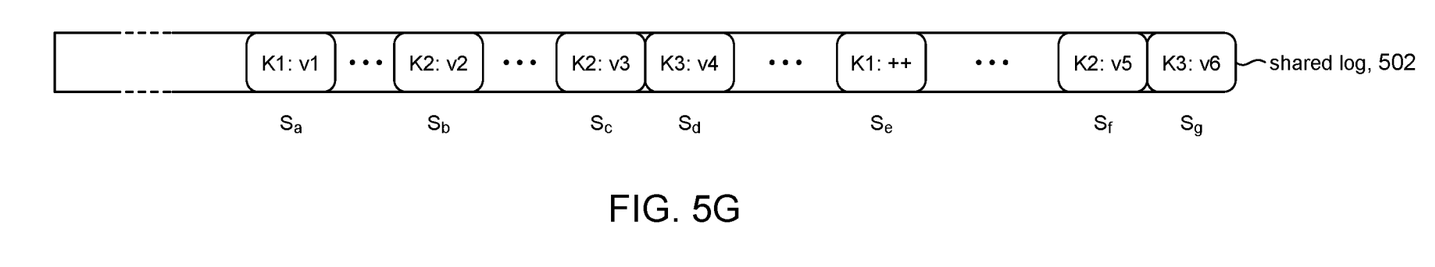
FIG. 5G shows the shared log after a new log entry has been appended to it.
Figure 5H:
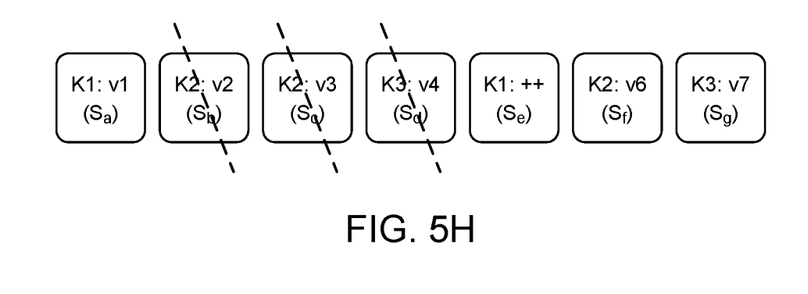
FIG. 5H illustrates identification of obsolete log entries.

Per operation 416, client C2 can identify obsoleted log entries among the log entries associated with the shared data object. FIG. 5G shows the list of log entries retrieved by client C2, which now includes the newly written log entry at time $S_g$. An obsoleted (garbage) operation is an update that does not contribute any additional information to the current global state (up-to-date version) of the shared data object. In the context of our example, for instance, if the latest (most recent) update operation is modifying the value of a specific key, then all the previous operations on the same key should be identified as obsolete (garbage). Referring to FIG. 5H, for example, log entries $S_b$ and $S_c$ should be identified as obsolete because the more recent log entry at $S_f$ updates the same key as log entries $S_b$ and $S_c$. The updates to key K2 at $S_b$ and $S_c$ do not contribute any additional information to the current global state of the shared data object insofar as key K2 is concerned. Likewise, for log entry $S_d$, because the log entry at $S_g$ overwrites the update at $S_d$. On the other hand, the log entry at $S_a$ which updates key K1 should not be identified as obsolete because the log entry at $S_e$ increments the value associated with key K1. As such, the operation performed on key K1 at time $S_a$ contributes information to the current global state of the data object.

Figure 5I:
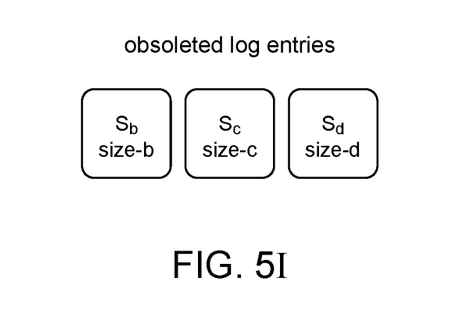
FIG. 5I shows a list of identified obsoleted log entries.

FIG. 5I shows the resulting list of identified obsoleted log entries, which can be sent to the shared log server (operation 418). In accordance with some embodiments, the list of identified obsoleted log entries can include information that identify the positions in the shared log of the respective obsoleted log entries and respective size information of the obsoleted log entries. These aspects of the present disclosure is discussed below.

Figure 6:
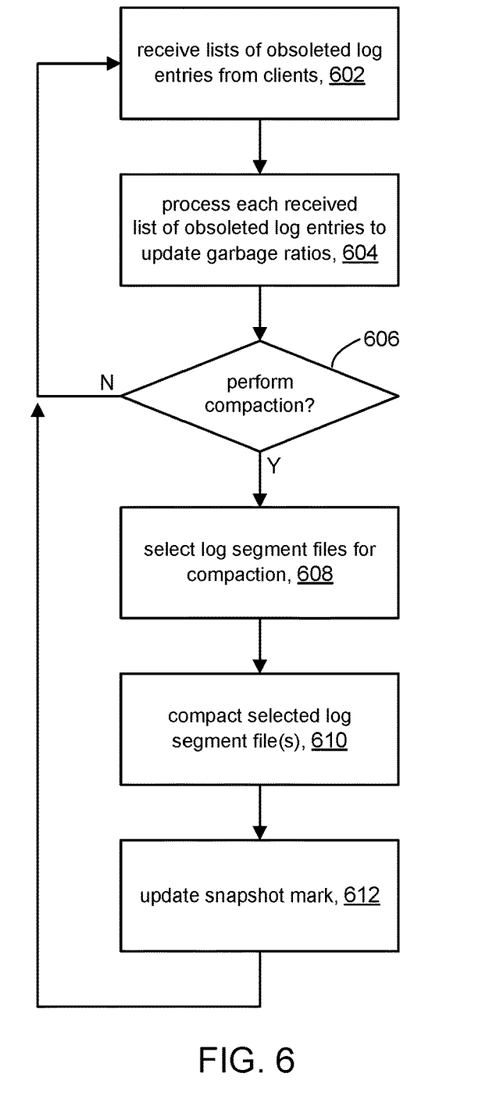
FIG. 6 shows processing in a shared log server in accordance with the present disclosure.

Referring to FIG. 6, the discussion will now turn to a high level description of processing in a shared log server (e.g., shared log server 122, FIG. 1) to perform garbage collection of obsoleted (garbage) log entries in accordance with the present disclosure. In some embodiments, the client computer can include computer executable program code, which when executed by a processor (e.g., 802, FIG. 8), can cause the processor to perform processing in accordance with FIG. 4.

At operation 602, the shared log server can receive lists of obsoleted log entries from the clients in the system. In some embodiments, deduplication can be performed on the received lists of obsoleted log entries. Because multiple clients can open and sync the same object, it is possible that multiple clients can identify and send the same garbage entries to the shared log server. This can result in unnecessary network traffic and processing time. Accordingly, in some embodiments, the shared log server can do two things:

(1) Deduplicate the garbage information. For example, if the same garbage locator (position of obsolete entry) is seen, do not store/process it again. This can be done using a hashmap, for instance. (2) Use a high-watermark to reduce redundant traffic. Because the garbage entries are identified by clients during sync, they are identified in order. Suppose for example, that the largest garbage locator in the shared log server is, say 80. Then, if any client sends a garbage locator less than 80, the shared log server can respond to the client with the high watermark 80 to inform this client that some other client has already sent garbage locator up to 80. The client will then know it needs only to send obsoleted log entries for garbage that is located beyond the high watermark (in our example, 80), thus reducing the traffic to the shared log server.

At operation 604, the shared log server can process each received list of obsoleted log entries to compute updated garbage ratios. Recall from FIG. 2, that the shared log can be persisted among a set of log segment files. Each log segment file stores some number of log entries in the shared log. Some of the log entries in a log segment file may be identified as obsolete (garbage) for garbage collection purposes. The garbage ratio is a metric that is associated with each log segment file. Depending on implementation details, the garbage ratio can be the ratio of the number of garbage log entries to non-garbage log entries in the log segment file. The garbage ratio can be a ratio of the number of garbage log entries to the total number of log entries in the log segment file.

In some embodiments, the garbage can be a ratio of sizes. In accordance with some embodiments, for example, the garbage ratio can be a ratio of $size_{garbage}$ (the total size of log entries in the log segment file that are identified as garbage log entries) to $size_{total}$ (the total size of the log segment file itself). When the shared log server receives a list of obsoleted log entries from a client, each log entry in the received list can be processed as follows:

The location of the obsoleted log entry can be used to identify the log segment file that contains the log entry.

A garbage size metric that indicates the total size of garbage log entries in the log segment file (e.g., $size_{garbage}$) can be incremented by the size of the obsoleted log entry. In some embodiments, the size of the obsoleted log entry can included in the list of obsoleted log entries (e.g., FIG. 5I). In other embodiments, the size can be determined by reading the contents of the log segment file itself.

This can be repeated to process each obsoleted log entry in the received list of obsoleted log entries.

At operation 606, the shared log server can determine whether or not to perform a compaction cycle (garbage collection). In some embodiments, log segment files that meet a predetermined garbage ratio can be selected for compaction. A log segment file that meets this criterion can trigger a compaction cycle. In other embodiments, the occurrence of total disk usage exceeding a predetermined threshold can serve as a trigger for compaction irrespective of garbage ratio. It will be appreciated that other triggering criteria can be employed.

At operation 608, the shared log server can select one or more log segment files to compact when a compaction cycle is triggered. In some embodiments, for example, where the trigger is garbage ratio exceeding a predetermined, the log segment files that meet this criterion can be selected for compaction. In other embodiments, where disk usage is used to trigger a compaction cycle, all the log segment files can be selected for compaction.

At operation 610, the shared log server can compact one or more log segment files. In some embodiments, for example, compaction of a log segment file can include the shared log server reading out each log entry from the log segment file and writing it back to a new log segment file if that log entry is not identified as being garbage. In some embodiments, the log segment files selected for compaction can be sorted according to the their garbage ratios. The sorted log segment files can be compacted in order, beginning with the log segment file having the largest garbage ratio. Where the garbage collection trigger is garbage ratio exceeding a predetermined, all the log segment files can be compacted. Where the trigger is disk usage, in some embodiments, the sorted log segment files can be compacted one at a time until disk usage falls below a predetermined termination threshold.

Figure 7:
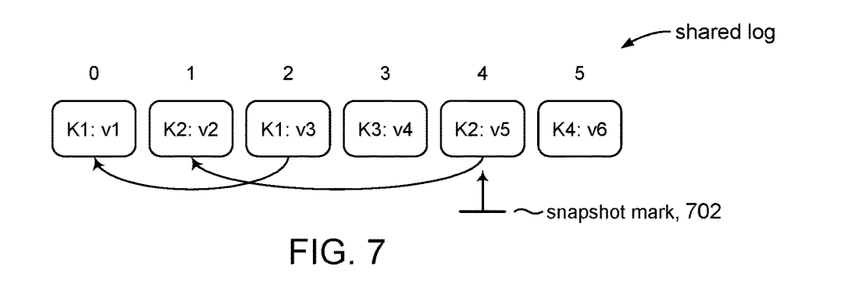
FIG. 7 illustrates a snapshot mark in accordance with the present disclosure.

At operation 612, the shared log server can update a snapshot mark. The snapshot mark supports snapshot transactions in accordance with the present disclosure. A snapshot transaction provides the data states (snapshot) of all the shared data objects up to the point in time specified by the snapshot address. In some embodiments, for example, a snapshot can be generated by replaying log entries in the shared log from the beginning of the shared log up to the snapshot address. Referring to the shared log example shown if FIG. 7, for instance, a snapshot at a snapshot address of 3 would include to following data state:

<K1:v3>,<K2:v2>,<K3:v4>

Suppose that the shared log is compacted. We can see that compaction will delete the log entries at time 0 and time 1. Suppose now that a snapshot transaction is requested at snapshot address 3. The data state will be:

<K1:v3> and <K3:v4>, which is incomplete because the log entries at times 0 and 1 will have been deleted. Note, however, that a snapshot at time 4 and higher will yield a complete data state.

In accordance with the present disclosure, the shared log server can maintain a snapshot mark (e.g., snapshot mark 702) to indicate the lowest snapshot address (earliest time) that can be specified by the client. As can be seen in FIG. 7, in some embodiments a log entry that makes obsolete an earlier log entry can include a back pointer that points to that earlier log entry. For example, the log entry at time 2 obsoletes the log entry at time 0, and likewise the log entry at time 4 obsoletes the log entry at time 1. In some embodiments, the garbage locator described in FIG. 5F can serve as this back pointer.

Continuing with operation 612, in accordance with the present disclosure, the shared log server can update the snapshot mark according to the following rule: set the snapshot mark to the address of the most recent-in-time log entry that points to an already compacted log entry. If an entry is actually deleted, then the snapshot mark is updated to be the address that marks the deleted entry obsolete, if that address is larger than current snapshot mark (snapshot mark is monotonic). In FIG. 7, if entry 0 is first compacted away, then snapshot mark is updated to 2, later if entry 1 is compacted, snapshot mark is updated to 4.

In some embodiments, the shared log server can communicate the snapshot mark to the clients, for example, by piggybacking the snapshot mark in any messages that get sent to the clients. This informs the clients of the earliest time, vis-à-vis the snapshot mark, that they can request a snapshot for. In the example in FIG. 7, for instance, clients will know not to request snapshots earlier than time 4.

Figure 8:
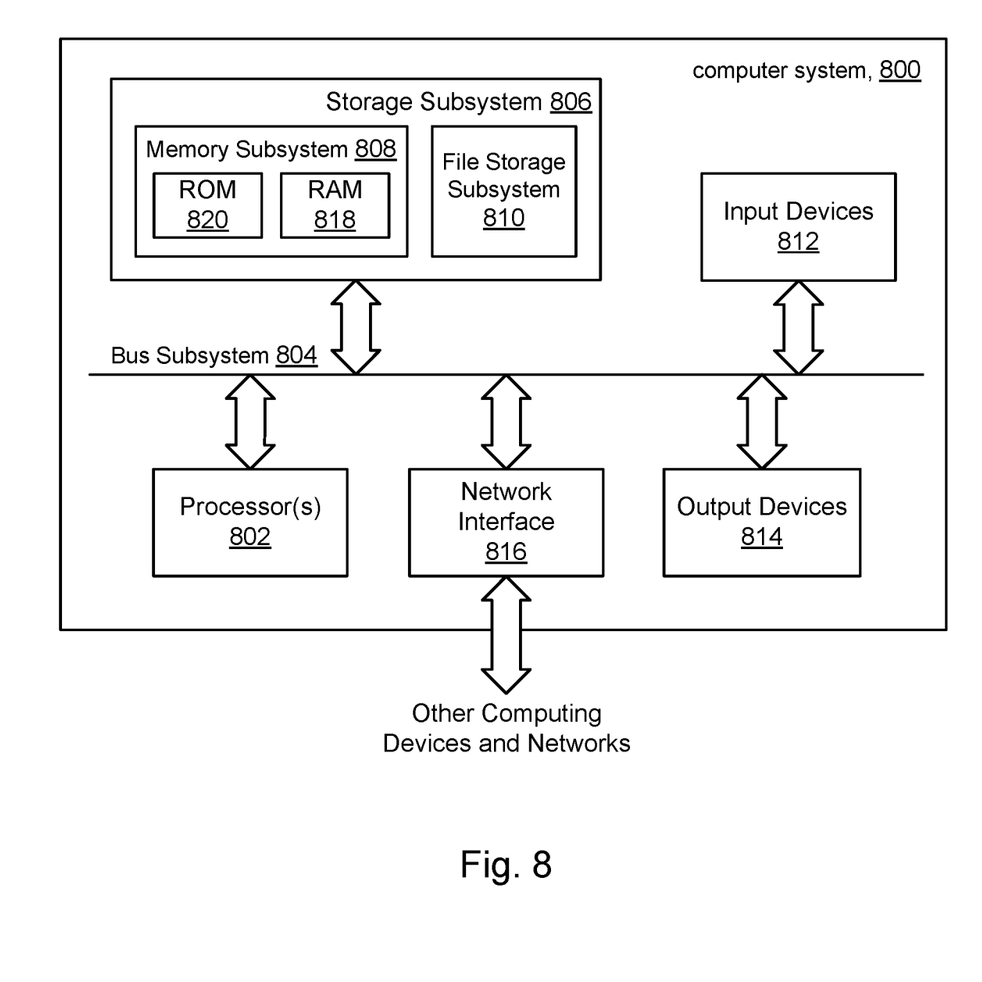
FIG. 8 illustrates a computer system in accordance with the present disclosure.

FIG. 8 depicts a simplified block diagram of an example computer system 800 according to certain embodiments.

Computer system 800 can be used to implement packet forwarding module 100 described in the present disclosure. As shown in FIG. 8, computer system 800 includes one or more processors 802 that communicate with a number of peripheral devices via bus subsystem 804. These peripheral devices include storage subsystem 806 (comprising memory subsystem 808 and file storage subsystem 810), user interface input devices 812, user interface output devices 814, and network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Memory subsystem 806 includes memory subsystem 808 and file/disk storage subsystem 810 represent non-transitory computer-readable storage media that can store program code and/or data, which when executed by processor 802, can cause processor 802 to perform operations in accordance with embodiments of the present disclosure.

Memory subsystem 808 includes a number of memories including main random access memory (RAM) 818 for storage of instructions and data during program execution and read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method performed by a client computer among a plurality of client computers, the method comprising:
   receiving an object modification request for a shared object;
   receiving from a shared log server separate from the client computer a plurality of updates that were previously performed on the shared object, the plurality of updates being maintained by the shared log server in a shared log;
   computing a current state of the shared object using the plurality of updates and the received object modification request;
   sending to the shared log server a new update representative of a modification specified in the received object modification request;
   identifying one or more obsoleted updates among the plurality of updates, the one or more obsoleted updates corresponding to updates to the shared object that are rendered obsolete by the new update and thus do not contribute any additional information to the current state of the shared object; and
   in addition to sending to the shared log server the new update, sending to the shared log server locator information associated with the one or more obsoleted updates, the locator information corresponding to locations of the one or more obsoleted updates in the shared log.

2. The method of claim 1, wherein the locator information includes size information corresponding to the one or more obsoleted updates.

3. The method of claim 1, wherein the plurality of updates that were previously performed on the shared object include updates that were previously performed by other client computers among the plurality of client computers.

4. The method of claim 1, further comprising receiving a snapshot mark that varies as obsoleted log entries are deleted from the shared log, the snapshot mark indicating an earliest point in time when a snapshot of the shared log can be taken.

5. The method of claim 1, further comprising sending the locator information to the shared log server independently of sending the new update to the shared log server.

6. The method of claim 1, wherein the locator information is sent to the shared log server at predetermined intervals of time.

7. The method of claim 1, further comprising sending to the shared log server a request to obtain the plurality of updates, the request including a first location identifier that is associated with an earliest update among the plurality of updates and a second location identifier that is associated with a latest update among the plurality of updates.

8. The method of claim 1, wherein the shared log server receives from other client computers among the plurality of client computers locator information associated with updates to the shared object that are obsolete and uses the received locator information to delete the associated updates from the shared log.

9. The method of claim 1 wherein the shared log is structured as a key-value store, wherein the new update corresponds to a change to a value of a key in the key-value store, and wherein the one or more obsoleted updates correspond to prior changes to the value of the key.

10. The method of claim 1 wherein the locator information is sent to the shared log server when a number of the one or more obsoleted updates reaches or exceeds a predetermined size.

11. The method of claim 1 wherein the locator information is sent to the shared log server in response to receiving a signal from the shared log server.

12. A non-transitory computer-readable storage medium having stored thereon computer executable instructions, which when executed by a computer device, cause the computer device to:
   receive an object modification request for a shared object;
   receive from a shared log server separate from the client computer a plurality of updates that were previously performed on the shared object, the plurality of updates being maintained by the shared log server in a shared log;
   compute a current state of the shared object using the plurality of updates and the received object modification request;
   send to the shared log server a new update representative of a modification specified in the received object modification request;
   identify one or more obsoleted updates among the plurality of updates, the one or more obsoleted updates corresponding to updates to the shared object that are rendered obsolete by the new update and thus do not contribute any additional information to the current state of the shared object; and
   in addition to sending to the shared log server the new update, send to the shared log server locator information associated with the one or more obsoleted updates, the locator information corresponding to locations of the one or more obsoleted updates in the shared log.

13. The non-transitory computer-readable storage medium of claim 12, wherein the locator information includes size information corresponding to the one or more obsoleted updates.

14. The non-transitory computer-readable storage medium of claim 12, wherein the plurality of updates that were previously performed on the shared object include updates that were previously performed by other client computers among the plurality of client computers.

15. The non-transitory computer-readable storage medium of claim 12, wherein the computer executable instructions, which when executed by the computer device, further cause the computer device to send the locator information to the shared log server independently of sending the new update to the shared log server.

16. The non-transitory computer-readable storage medium of claim 12, wherein the computer executable instructions, which when executed by the computer device, further cause the computer device to receive a snapshot mark that varies as obsoleted log entries are deleted from the shared log, the snapshot mark indicating an earliest point in time when a snapshot of the shared log can be taken.

17. The non-transitory computer-readable storage medium of claim 12, wherein the computer executable instructions, which when executed by the computer device, further cause the computer device to send to the shared log server a request to obtain the plurality of updates, the request including a first location identifier that is associated with an earliest update among the plurality of updates and a second location identifier that is associated with a latest update among the plurality of updates.

18. The non-transitory computer-readable storage medium of claim 12, wherein the shared log server receives from other client computers among the plurality of client computers locator information associated with updates to the shared object that are obsolete and uses the received locator information to delete the associated updates from the shared log.

19. An apparatus comprising:
   one or more computer processors; and
   a computer-readable storage medium comprising instructions for controlling the one or more computer processors to:
   receive an object modification request for a shared object;
   receive from a shared log server separate from the client computer a plurality of updates that were previously performed on the shared object, the plurality of updates being maintained by the shared log server in a shared log;
   compute a current state of the shared object using the plurality of updates and the received object modification request;
   send to the shared log server a new update representative of a modification specified in the received object modification request;
   identify one or more obsoleted updates among the plurality of updates, the one or more obsoleted updates corresponding to updates to the shared object that are rendered obsolete by the new update and thus do not contribute any additional information to the current state of the shared object; and
   in addition to sending to the shared log server the new update, send to the shared log server locator information associated with the one or more obsoleted updates, the locator information corresponding to locations of the one or more obsoleted updates in the shared log.

20. The apparatus of claim 19, wherein the locator information includes size information corresponding to the one or more obsoleted updates.

21. The apparatus of claim 19, wherein the plurality of updates that were previously performed on the shared object include updates that were previously performed by other client computers among the plurality of client computers.

22. The apparatus of claim 19, wherein the computer-readable storage medium further comprises instructions for controlling the one or more computer processors to receive a snapshot mark that varies as obsoleted log entries are deleted from the shared log, the snapshot mark indicating an earliest point in time when a snapshot of the shared log can be taken.

23. The apparatus of claim 19, wherein the computer-readable storage medium further comprises instructions for controlling the one or more computer processors to send to the shared log server a request to obtain the plurality of updates, the request including a first location identifier that is associated with an earliest update among the plurality of updates and a second location identifier that is associated with a latest update among the plurality of updates.

* * * * *